United States Patent Office 3,749,599
Patented July 31, 1973

3,749,599
PROCESS FOR TREATING SYNTHETIC FIBER WITH A FIRE RETARDANT AND THE TREATED FIBER
Sylvester Bergman, Midland, Mich., assignor to The Dow Chemical Company, Midland, Mich.
No Drawing. Filed Sept. 13, 1971, Ser. No. 180,198
Int. Cl. C09d 5/18
U.S. Cl. 117—136     8 Claims

ABSTRACT OF THE DISCLOSURE

Polyester, cellulose triacetate, and polyamide fibers are made fire retardant by contacting with a hot glycol solution of 2-(2,4,6-tribromophenoxy) ethanol. This compound also acts as a dye assistant for polyester and cellulose triacetate fibers. The treated fibers are resistant to loss of the brominated compound during laundering and dry cleaning processes.

BACKGROUND OF THE INVENTION

The present invention relates to the conditioning of polyester, nylon, and cellulose triacetate fibers with a glycol solution of a bromine-containing fire retardant agent which also imparts dye receptivity to the treated polyester and triacetate fibers. The invention also relates to the fibers treated by the new process.

Fabrics and fibers of polyester or cellulose triacetate are ordinarily dyed with so-called disperse dyes which act by incorporation of the dye molecules directly into the fiber structure to form a solid solution. In order to facilitate this process, these fibers are treated with a dye assistant prior to or in the course of the dyeing process. According to one theory, the dye assistant functions by swelling the fiber and so facilitating uniform absorption of the dye. Usually, the dye assistant is incorporated into the aqueous dye-bath and the fiber or fabric is treated simultaneously with both the dye assistant and the dyestuff. Typical dye assistants are biphenyl, salol, o-phenylphenol, trichlorobenzene, benzoic acid, and methyl salicylate.

It is known to improve the dyeability of polyester fibers by treating them with a hot liquid polyol. Such a process is described by Hermes, U.S. 2,938,811, and the treatment is taught to eliminate the need for a dye assistant. It is also known to make polyester and cellulose triacetate fibers more dye receptive and fire retardant by treating them with a volatile, water-insoluble solvent solution of 2-(2,4,6-tribromophenoxy)ethanol prior to dyeing or to incorporate this compound directly into an aqueous dyebath. These processes are described in the copending applications of myself and another, Ser. Nos. 166,248 and 166,249 entitled "Improved Synthetic Fiber Treatment" and "Process for Making Fibers Dye-Receptive and Fire-Retardant" respectively, both filed July 26, 1971.

Nylon fibers are also dyed with disperse dyes as well as a number of other types. However, since polyamides are relatively receptive to dyes, the dyeing process is adjusted to the particular polymer by the type of dye used, pH of the dyebath, and so on rather than by use of a dye assistant.

After the dyeing process, the dyed fiber is subjected to a hot scour to remove surface deposits of color and most of the dye assistant. The last traces of dye assistant are usually removed by a short heat treatment. Removal of essentially all of the dye assistants conventionally used is desirable, because most of these known substances adversely affect light-fastness if left in the dyed material. The prior art dye assistants may also adversely affect physical properties of the fiber, impart an undesirable odor, or have other such deleterious effects if not removed.

In recent years there has developed an increasing urgency toward making textile fabrics more resistant to burning. This has been done by a surface treatment of the dyed fabric with one or more fire-retardant chemicals and it has also been done by incorporating a fire-retardant compound into a polymer fiber as a plasticizer or merely as an additive. Fire-retardant monomers have been copolymerized into the polymer structure to obtain this effect. However, all of these methods are subject to characteristic disadvantages. Surface treatment of a fabric usually has only a temporary effect and the fire-retardant chemical is rapidly lost when the fabric is laundered or dry cleaned. Additives to the polymer physically mixed with or incorporated chemically into the polymer usually detract seriously from the properties of the polymer fiber so that while the fire retarding effect may be relatively permanent, the fiber is often more brittle, of lower tensile strength, or with less resistance to oxidative degradation.

SUMMARY OF THE INVENTION

It has now been found that essentially permanent fire-retardant properties are imparted to polyester, polyamide, and cellulose triacetate fibers when these fibers are contacted at a temperature from about 120° C. to the softening point of the fiber with a glycol having dissolved therein a fire retarding concentration of 2-(2,4,6-tribromophenoxy)ethanol.

Preferably, this conditioning process is used as a pre-treatment before dyeing a polyester or cellulose triacetate fiber with a disperse dye whereby the fiber is made both dye receptive and fire retardant. The invention is, of course, used in a similar manner for polyamide fibers or fabric. In this case, the conditioning treatment serves chiefly to make the nylon fire retardant.

DETAILED DESCRIPTION

The terms glycol and alkylene glycol are used herein to mean the lower alkylene glycols and the corresponding dialkylene glycols such as ethylene glycol, diethylene glycol, propylene glycol, dipropylene glycol, and butylene glycol. Surprisingly, polyols of higher functionality such as glycerol and butanetriol are not operable in the present process.

The process is carried out by wetting or immersing the fiber or fabric to be treated in a hot alkylene glycol solution containing about 5–20 percent of the tribromophenoxyethanol based on the weight of fiber whereupon there is a very rapid penetration of the fiber by the hot glycol and similarly rapid partitioning of the brominated compound from the solution into the fiber. Consequently, a relatively small amount of solution can be used. The process is virtually complete in a matter of few seconds, typically, 5–20 seconds is a sufficient time. Any temperature from about 120° C. to the softening point of the fiber is suitable and a temperature of about 150–200° C. is preferred. The process appears to be less temperature-dependent than the known glycol treatment of polyester. The treated fiber is washed with water to remove substantially all of the alkylene glycol. Traces of the alkylene glycol may remain within the fiber. The brominated compound absorbed into the fiber remains there and is not significantly affected by subsequent washing or dyeing operations.

When conditioned by this process as described, the fiber contains about 3–15 percent by weight of the brominated compound and it is thereby rendered substantially and permanently more resistant to burning. Carpeting, for example, treated by this process will pass the so-called "tablet test" (DOC FFI–70). The hot glycol and the brominated compound cooperate to enhance the receptivity of polyester and cellulose triacetate fibers to dyeing and the dyed fibers have a deeper shade as compared to the same materials treated with the hot glycol alone. The glycol has a further beneficial effect, particularly in polyester, in that it inhibits pilling effects as well as improving dye receptivity.

A special advantage of the tribromophenoxyethanol is that the light-fastness of dyes and physical properties of fibers dyed by this process are not affected. The dyed material has no undesirable odor and its physical appearance is the same as that dyed by conventional processes.

This new fiber treating process can be used as a pretreatment prior to a conventional aqueous dyeing process using any of the disperse dyes used to dye polyester, polyamide, and cellulose triacetate fibers. The tribromophenoxyethanol deposited on the fibers from the glycol solution can be the sole dye assistant in the dyeing process or a conventional dye assistant such as biphenyl can also be used in the aqueous dyebath if additional dye assistant is desired. Some representative disperse dyes are C.I. (Color Index) Disperse Red 1, C.I. Disperse Blue 55, C.I. Disperse Red 60, C.I. Disperse Yellow 23, and C.I. Disperse Red 55.

The term "polyester" is used herein in its usual sense to mean highly polymeric, essentially linear and saturated polyester resins made by the reaction of a dicarboxylic acid or ester with a diol in the presence of an esterification or ester interchange catalyst. Illustrative dicarboxylic acids are malonic, succinic, adipic, azelaic, hydromuconic, isophthalic, terephthalic, and cyclohexanedicarboxylic acids. Representative diols are ethylene glycol, propylene glycol, butylene glycol and 1,6-hexanediol. The common commercial polyester resins are polyethylene terephthalate and polyethylene terephthalate modified by inclusion of minor proportions of a different glycol or dicarboxylic acid during the polyesterification process. The polyester used in the examples was polyethylene terephthalate.

Cellulose triacetate is used in its conventional sense to means the fully esterified material where there has been little or no hydrolysis of the acetate groups on the cellulose molecule.

The term polyamide is also used in its conventional sense as a generic name for long chain synthetic polyamides where recurring amide groups form an integral part of the polymer chain. The term nylon is often used to mean the same thing. Examples are nylon 6, nylon 66, nylon 7 and nylon 11.

EXAMPLES 1–4

Solutions of ten percent by weight 2-(2,4,6-tribromophenoxy)ethanol in ethylene glycol, diethylene glycol, propylene glycol and dipropylene glycol respectively were padded at 180° C. into samples of polyester cloth having a weight of 4 ounces per square yard. After 15 seconds, the treated cloth samples were washed in cold water and dyed in a conventional aqueous dyebath containing C.I. Disperse Violet 18 but with no dye assistant present in the bath. The ratio of bath liquor to fabric was about 30:1. The cloth samples were put in the bath at 75° C., the bath was heated to boiling in about 15 minutes and the samples were left in the boiling bath for one hour. The dyed samples were then rinsed and dried.

All of these dyed samples of cloth showed a uniform deep shade of color. Similar samples of cloth which had no treatment prior to dyeing or were treated with hot glycol alone showed substantially lighter shades of color when dyed in the same way, those treated with glycol only having a shade intermediate between that of the samples of the above examples and the untreated cloth.

The treated and dyed cloth samples of Examples 1–4 retained about 4 percent by weight of 2-(2,4,6-tribromophenoxy)ethanol and exhibited substantially reduced flammability as compared to samples containing none of the brominated compound.

Comparable results are obtained when the procedure of the above examples is repeated with nylon or cellulose triacetate fibers or cloth in place of the polyester fabric.

I claim:

1. A process for conditioning and making fire retardant a polyester, cellulose triacetate or polyamide fiber which comprises contacting said fiber at a temperature from about 120° C. to the softening point of the fiber with a lower alkylene glycol having dissolved therein a fire retarding concentration of 2 - (2,4,6 - tribromophenoxy) ethanol.

2. The process of claim 1 wherein the conditioned fiber is washed with water to remove substantially all of the alkylene glycol.

3. The process of claim 1 wherein the temperature is about 150–200° C.

4. The process of claim 1 wherein the glycol solution contains about 5–20 percent of 2-(2,4,6-tribromophenoxy)ethanol based on the weight of fiber.

5. The process of claim 1 wherein the fiber is a polyester.

6. The process of claim 5 wherein the fiber is polyethylene terephthalate.

7. The fiber product of the process of claim 1.

8. The fiber product of claim 7 wherein the fiber is polyethylene terephthalate.

References Cited
UNITED STATES PATENTS

| | | | |
|---|---|---|---|
| 2,660,543 | 11/1953 | Walter et al. | 117—136 |
| 2,754,324 | 7/1956 | Brust et al. | 260—613 D |
| 2,938,811 | 5/1960 | Hermes | 117—102 |
| 3,321,330 | 5/1967 | Mohney | 117—136 |
| 3,600,219 | 8/1971 | Reuter | 117—136 |
| 3,642,525 | 2/1972 | Chapin | 117—136 |

WILLIAM D. MARTIN, Primary Examiner

T. G. DAVIS, Assistant Examiner

U.S. Cl. X.R.

8—173; 117—138.8 F, 138.8 N, 144; 252—8.1